United States Patent [19]

Washburn

[11] 4,331,771
[45] May 25, 1982

[54] HIGH DENSITY SILICON OXYNITRIDE

[75] Inventor: Malcolm E. Washburn, Princeton, Mass.

[73] Assignee: Norton Company, Worcester, Mass.

[21] Appl. No.: 148,853

[22] Filed: May 12, 1980

[51] Int. Cl.$^3$ .............................................. C04B 35/58
[52] U.S. Cl. ........................................ 501/97; 264/65
[58] Field of Search ...................... 106/55, 73.5, 73.2; 264/65; 501/97

[56]  References Cited
U.S. PATENT DOCUMENTS

| | | | |
|---|---|---|---|
| 3,356,513 | 12/1967 | Washburn | 106/55 |
| 3,639,101 | 2/1972 | Washburn | 106/55 |
| 3,679,444 | 7/1972 | Washburn | 106/55 |
| 3,892,840 | 7/1975 | Abildtrup | 106/55 |
| 4,069,058 | 1/1978 | Washburn | 106/73.5 |
| 4,143,107 | 3/1979 | Ishii et al. | 106/73.5 |

FOREIGN PATENT DOCUMENTS 2221421  10/1974  France.

Primary Examiner—Mark Bell
Attorney, Agent, or Firm—Arthur A. Loiselle, Jr.

[57]  ABSTRACT

A reaction bonded silicon oxynitride product having a density of 85 to 95% of theoretical density, a degree of density heretofore not attainable by sintering or reaction bonding. Such high densities are attained by nitriding, in an oxygen free atmosphere ultra fine silicon and ultra fine silica in the presence of certain reaction aids. The particle size of the silicon powder must be at least as fine as about 3 microns and the silica as fine as about 0.3 microns.

8 Claims, 2 Drawing Figures

HIGH DENSITY SILICON OXYNITRIDE

TECHNICAL FIELD

The invention relates to the fabrication of silicon oxynitride articles by reaction bonding. More specifically the invention is concerned with very high density silicon oxynitride products and a method for making said products.

BACKGROUND ART

Prior Art Statement

The following publications are representative of the most relevant prior art known to the Applicant at the time of filing the application.

| UNITED STATES PATENTS | | |
|---|---|---|
| 3,356,513 | December 5, 1967 | M. E. Washburn |
| 3,639,101 | February 1, 1972 | M. E. Washburn |
| 3,679,444 | July 25, 1972 | M. E. Washburn |
| 3,892,840 | July 1, 1975 | Jorgen Abildtrup |
| 4,069,058 | January 17, 1978 | M. E. Washburn |
| FOREIGN PATENTS | | |
| 2,221,421 | October 11, 1974 | France |

The Washburn U.S. Pat. No. 3,356,513 discloses processes for synthesizing silicon oxynitride and shaped articles of that material. Powdered silicon oxynitride of relatively high purity is prepared by reacting from 47.5 to 98 wt.% of silicon powder with 1 to 50 wt.% of fine silica in the presence of up to 5 wt.% of an alkaline earth or rare earth oxide. The mixture is fired to about 1350° C. in an atmosphere of $N_2$ and $O_2$ wherein the ratio of $O_2$ to $N_2$ is from 1 to 99 to 6 to 94 parts by volume. The particle size of the starting powders is preferably 20 microns and finer. To form silicon oxynitride shapes by the so-called reaction bonding method, the above mixture of powders is cold pressed to the desired shape and fired in an air-$N_2$ atmosphere at 1450° C., the particles size of the powders being preferably 20 microns and finer. The resulting article has a desnity of 1.97 g/cm$^3$. In another embodiment, silicon oxynitride powder synthesized as described, is crushed so as to pass through a 100 mesh screen (U.S. Standard Sieve Series). The powder is hot pressed at 1700° C. under 6000 p.s.i. for 13 minutes. The resulting piece has a density of 2.7 g/cm$^3$ i.e. about 96% of the theoretical density.

U.S. Pat. No. 3,639,101 is relevant for its teaching that all of the $O_2$ needed for the silicon oxynitride forming reaction can be added as a solid to the mix, in the form of silica. The highest density product which is produced by reaction bonding is 2.01 g/cm$^3$.

A method of forming reaction bonded silicon oxynitride products is taught by U.S. Pat. No. 3,679,444 wherein growth and shrinkage is controlled by using varying amounts of very fine silica in the Si-SiO$_2$-reaction promoter raw batch mix. A range of 2 to 15% by weight of the raw batch mix advantageously is silica fume (particle size of 0.5 microns or less), the normal total amount of silica being about 40% by weight. It is also taught that where high density products are desired and dimensional stability is not critical, all of the silica in the mix may be present as silica fume.

The Abildtrup reference U.S. Pat. No. 3,892,840 discloses a method of forming silicon oxynitride products free of silica. This is accomplished by heating a preformed silicon shape, wherein the silicon particle size is in accordance with FEPA Standard F320/29 or finer, between 1200° and 1600° C. in an $O_2$-$N_a$ atmosphere with a partial pressure of $O_2$ lower than $10^{-17}$ atmosphere.

The Washburn patent U.S. Pat. No. 4,069,058 is concerned with bonding silicon oxynitride grain that is relative coarse, with fine crystals of silicon oxynitride. It is relevant for its disclosure of the use of fine (2 microns) silicon and the use of reaction or sintering aids such as calcium and magnesium fluorides.

French Pat. No. 2,221,421 to Mary et al involves a method for the manufacture of silicon oxynitride articles with densities as high as 92% of theoretical. This is accomplished by mixing free silicon oxynitride powder with an additive or reaction aid such as an alkaline earth oxide or an oxide of yttrium or aluminum and cold pressing the powder to the desired shape. The green shape is then coated with silicon oxynitride powder and fired at 1600° C. The shell or coating of silicon oxynitride is then chipped off or otherwise removed.

DISCLOSURE OF THE INVENTION

The invention is a reaction bonded silicon oxynitride product having a density greater than about 83% of theoretical density, the pores in the product being very small, thus resulting in an essentially impervious body. Another aspect of the invention, is the method of making said dense, impervious, reaction bonded silicon oxynitride products.

Silicon oxynitride products with densities as high as 2.7 g/cm$^3$ (~96% of theoretical) are known. These products, however, must be made by the expensive hot pressing process; in addition to being expensive, hot pressing drastically limits the degree of complexity of shape that can be fabricated. Silicon oxynitride shapes with densities as high as 92% of theoretical have been made according to the French patent described above, but this method involves sintering already synthesized silicon oxynitride particles rather than by reaction bonding which is the process of the present invention. Silicon oxynitride refractory materials made as described in U.S. Pat. Nos. 3,356,513; 3,639,101; and 3,679,444 show excellent performance in corrosive environments, particularly those involving halogens or halides in the gaseous or molten state. A limiting factor with this form of silicon oxynitride, however, is its density or permeability. This material normally has a density in the range of 2.0 to 2.3 g/cc which is 71% to 82% of the theoretical density of silicon oxynitride which is 2.8 g/cc. Porosity of this material can range from 18% to 29%.

More explicitly, the invention method produces bodies of silicon oxynitride with density higher than 2.3 g/cc and as high as 2.6 g/cc or 93% of theoretical. Bodies of this nature with densities greater than 90% of theoretical appear to be impervious to molten salts such as cryolite at 1000° C. Bodies 85% and higher of theoretical show a high degree of imperviousness.

Previous work as described in U.S. Pat. No. 3,679,444 shows that the addition of a colloidal silica such as silica fume results in a shrinkage of the body as high as 3 percent linear or 10 percent by volume. Up to 15% of silica fume can be added to control shrinkage yet not result in excessive shrinkage. Excessive shrinkage, besides making it difficult to hold dimensions, results in incomplete reaction of the raw batch, the reaction being dependent upon nitrogen diffusion through the pores in the body. When such incomplete reaction is found, unconverted raw batch materials, silicon and silica, are present in the core surrounded with a dense glassy appearing reacted material on the outer surfaces. The impervious covering apparently seals the surface preventing diffusion of nitrogen into the body.

Densification thus depends upon weight gain due to nitridation occurring simultaneously with shrinkage. If shrinkage occurs before nitridation, incomplete reaction results. If nitridation occurs before shrinkage, then the formation of a structure of silicon oxynitride will resist shrinkage. The nitridation of the $SiO_2+Si$ raw batch is believed to take place through the formation of a liquid phase. The liquid phase forms from additives or reaction aids such as calcium fluoride which combines with the Si and $SiO_2$ to form a complex molten silicate phase. It is speculated that the liquid phase forms around the silicon particles such that the particles are covered with a film of liquid. In a manner similar to that described by Dancy et al (Dancy, E. A. and Janssen, D., Canadian Metallurgical Quarterly 15 No. 2, 103 (1976)) the silicate phase is in a reduced form. Nitrogen dissolves in the molten phase and orthorhombic crystals of $Si_2ON_2$ form and grow out of the liquid film.

During the reaction the weight gain due to nitridation is a combination of weight gains and weight losses. It is believed that weight losses occur that are due to volatile phases forming. Control of weight loss and corresponding volatile phases is felt to be a key factor in getting densification to take place. As shrinkage occurs, a suitable balance of weight gain and weight loss is necessary to get a body with no unreacted material remaining, yet still have enough weight gain to get good densification of the piece.

Factors influencing the amount of weight loss found are thickness of the piece, temperature, type of additives or reaction aids and nature of the vapor phases around the body being fired.

The effect of thickness on weight loss can be seen in the following data for eight test bars of the same composition, fired together under the same conditions. The raw batch composition for these bars was 57.7% fine silicon, 41.3% silica fume, 1.0% CaO. They were fired in a large production kiln for firing normal density silicon oxynitride under a typical 12-day cycle having two high temperature soak periods of 24 hours at 1390° C. and 15 hours at 1420° C.

| THICKNESS | ACTUAL WEIGHT GAIN | WEIGHT LOSS* |
|---|---|---|
| .118" | 28.8% | 25.6% |
| .139 | 32.6 | 15.8 |
| .147 | 29.4 | 24.0 |
| .162 | 32.3 | 16.5 |
| .176 | 33.0 | 14.7 |
| .180 | 33.8 | 12.7 |
| .307 | 35.5 | 8.3 |
| .308 | 34.7 | 10.3 |

*wt loss = $100 - \frac{wt\ gain}{38.7\%} \times 100$

As seen in these data, weight loss decreased as thickness increased. No unreacted silicon could be seen in x-ray patterns of any of the bars. The thick bars showed higher weight gain and less weight loss than the thin bars. The thickest bar still showed 10% loss from the theoretical 38.7% value.

The effect of temperature on weight loss can be shown in the following data:

| REACTION TEMPERATURE | ACTUAL WEIGHT GAIN | % WEIGHT LOSS |
|---|---|---|
| 1280° C. | 25.2% | 34.9% |
| 1293 | 25.0 | 35.4 |
| 1340 | 23.1 | 40.3 |
| 1360 | 27.3 | 29.4 |
| 1380 | 30.9 | 20.2 |
| 1400 | 32.5 | 16.0 |

These data are for bars with a raw batch composition of 57.7% fine silicon, 31.0% silica fume, 10.3% Cabosil, and 1% CaO. They were fired in a number of tube furnace runs which were held at the cited reaction temperature for two 24 hour periods followed by a 24 hour soak at 1420° C. X-ray analysis of the fired bars showed no unreacted silicon, no cristobalite, approximately 94% $Si_2ON_2$ and about 6% $Si_3N_4$ in equal parts of alpha and beta types. As seen in the data, weight loss increases to a maximum at 1340° C. then drops suddenly to a low value at 1400° C.

The effect of the vapor phase on weight loss around the body is shown by the following experiment. Test bars were made from the same mix described in the effect of temperature experiment and two different runs were made on similar bars. Run 1 was made in a tube furnace in a container with the test bars surrounded by plates of green raw batch of standard XS811 mix (59% −200 Si, 35% −200 mesh fused silica, 5% silica fume, 1% CaO) and Run 2 was made in the same setup but the green plates were made up from the same composition as the test bars (57.7% 3 Si, 31.0% silica fume, 10.3% Cabosil and 1% CaO). The following results were obtained from the fired pieces.

|  | RUN 1 | RUN 2 |
|---|---|---|
| Actual Weight Gain | −2.5% | +7.7% |
| Approximate % Unreacted Silicon* | 0 | 50% |

*By X-ray Analysis

These results show that the atmosphere surrounding the bodies during firing must be of a certain characteristic and it must be present at a certain temperature and time during which both weight gain and shrinkage are occurring. In Run 1 the temperature of gaseous evolution from the surrounding plates did not coincide with the temperature of nitridation and shrinkage of the test body, thus a net weight loss was found. In Run 2 the temperature coincided and no weight loss was found.

The effect of the type of additive or reaction aid is shown in the following series of test bars and fired together in a tube furnace in the matching bed technique previously described.

|  | 97-1 | 97-2 | 97-3 | 97-4 |
|---|---|---|---|---|
| Additive (.64 mole %) | $CaF_2$ | CaO | BaO | MgO |
| % Δ length | −5.1 | −5.5 | −6.6 | −6.1 |
| % Δ weight | 32.5 | 24.6 | 12.9 | 24.2 |
| density | 2.41 | 2.35 | 2.27 | 2.36 |
| Approximate % $Si_2ON_2$* | 90 | 53 | 20 | 65 |
| % α $Si_3N_4$ | 0 | 0 | 0 | 0 |
| % β $Si_3N_4$ | 0 | 0 | 0 | 2 |
| % Cristobalite | 0 | 14 | 29 | 3 |
| % Silicon | 10 | 29 | 47 | 27 |
| % SiC | 0 | 4 | 4 | 3 |
| Calculated Theo. Density | 2.76 | 2.62 | 2.45 | 2.69 |
| % of Calc. Theo. Density | 87.3 | 89.7 | 92.6 | 87.7 |

| -continued | | | |
|---|---|---|---|
|  | 97-5 | 97-6 | 97-1A |
| Additive (.64 mole %) | MgF$_2$ | None | CaF$_2$ |
| % Δ length | −7.8 | −4.0 | −5.0 |
| % Δ weight | 10.7 | 35.5 | 30.7 |
| density | 2.20 | 2.29 | 2.45 |
| Approximate % Si$_2$ON$_2$* | 17 | 88 | 94 |
| % α Si$_3$N$_4$ | 0 | 8 | 1 |
| % β Si$_3$N$_4$ | 0 | 4 | 2 |
| % Cristobalite | 29 | 0 | 0 |
| % Silicon | 50 | 0 | 0 |
| % SiC | 4 | 0 | 3 |
| Calculated Theo. Density | 2.44 | 2.85 | 2.81 |
| % of Calc. Theo. Density | 90.1 | 80.4 | 87.2 |

*By X-ray Analysis

These results show that all the additives used result in greater shrinkage as measured by the change in length than if no additive is used. It also shows that the additives result in lower silicon nitride formation. The two bodies that showed the highest shrinkage, i.e. BaO and MgF$_2$ additives also showed the lowest weight gain and the highest unreacted silicon. These bodies were also the most impervious as shown by the % of calculated theoretical density. Very likely shrinkage occurred before weight gain in these bodies. The best body was 97-1 with CaF$_2$. The calculated theoretical density was arrived at from the aproximate analysis of all phases including unreacted Si as determined by X-ray analysis.

A repeat run of these test bars was made in the large silicon oxynitride production kiln in which temperatures were held longer and the atmosphere was suspected to contain more of a silicon monoxide volatile phase. The results were similar to those obtained from the tube furnace run. Test bar 97-1A with CaF$_2$ showed a high density 87.2% of theoretical and was completely reacted as determined by X-ray analysis.

It is believed that the calcium fluoride is influencing the weight loss by forming a volatile phase that keeps the reaction channels open during the reaction. Chemical analysis of samples before and after firing show the following loss of fluorine:

|  | % Fluorine |
|---|---|
| Raw batch 97-1 before firing | 0.54 |
| 97-1 after firing | 0.06 |

The key to complete reaction during densification is felt to be control of the volatile phases and maintaining enough open porosity during reaction to allow nitrogen to enter into the body.

Another factor that influences densification is the particle size of the reacting constituents, silicon and silica. The influence of the particle size of silicon can be seen in the following data:

|  | 18-1A | 18-2A | 18-3A |
|---|---|---|---|
| Silicon, avg. particle size | 3μ | 10μ | 3μ |
| % Δ length | −2.5% | −5.6% | −7.5% |
| Fired Density | 2.09 g/cc | 2.22 g/cc | 2.48 g/cc |
| % of Theoretical Density (2.80 g/cc) | 74.6% | 79.3% | 88.6% |

These bars were identical, except for the size of the silicon, having been fired in a large silicon oxynitride production run. As seen in the data, shrinkage and density increase as silicon particle size decreases.

The influence of the silica particle size is shown by the following data:

| Raw Batch: | 60-1 | 60-7 (97-1) |
|---|---|---|
| Silicon (3μ) | 57.7 | 57.7 parts by wt. |
| Silica Fume (.12μ) | 41.3 | 31.0 parts by wt. |
| Cab-O-Sil (.012μ) | 0 | 10.3 parts by wt. |
| CaO | 1.0 | 1.0 parts by wt. |
| % Δ volume | −16.0% | −16.1% |
| % Δ weight | 25.5% | 32.5% |
| % weight loss | 34.1% | 16.0% |
| density | 2.25 g/cc | 2.34 g/cc |
| % of Theo. | 80.4% | 83.6% |

As seen in the data the silica does not appear to influence the shrinkage but does show a difference in weight gain. Since no unreacted silicon was found in the X-rays, the difference is likely due to weight loss. The test bar containing Cab-O-Sil with extremely fine particle size showed less weight loss (16.0%) than the bar with no Cab-O-Sil (34.1%). The reason for this is believed to be due to a change in the nature of the liquid phase formed during reaction.

It has been found that uniform and completely reacted bodies can be made in the large production kiln used for producing silicon oxynitride refractories. Because the nature of the atmosphere in this kiln is different than that in a small tube furnace and is likely to have a higher silicon monoxide vapor pressure, it was found that items could be fired without a vapor generating bed. It was also found that lower green densities resulted in less unreacted silicon in the cores of bodies. This can be seen in the following data:

|  | Cylinder 140-2 | Crucible 142-1 |
|---|---|---|
| green density | 1.52 g/cc | 1.19 g/cc |
| fired density | 2.21 g/cc | 2.54 g/cc |
| % Δ length | −5.9% | −9.8% |
| % Δ weight | 31.3% | 33.3% |
| % of Si$_2$ON$_2$ density | 79.0% | 90.7% |

These items were about the same size, 8" high×4" O.D.×¼" wall, made from the same raw batch (97-1) and fired together in the large production kiln. As seen in the data the green density of the cylinder is higher than the crucible whereas the fired density is lower. The cylinder showed some unreacted silicon in the core of the body which is shown in part by the lower weight gain.

EXAMPLE OF THE PREFERRED EMBODIMENTS

EXAMPLE 1

Figure 1:
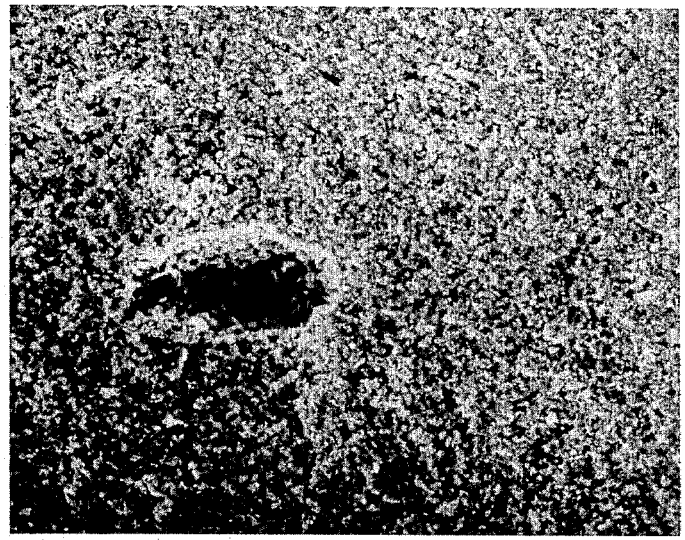
FIG. 1 is a photomicrograph (SEM) of the core of the cylinder of Example II magnified 500 times.

A crucible, 4¼" O.D.×3/16" wall×7⅜" high was isostatically pressed at 40,000 psi from the following raw batch. Green density was 1.61 g/cc.

| 3μ silicon | 57.5% |
|---|---|
| Silica Fume | 30.8 |
| Cab-O-Sil | 10.3 |

-continued

| | |
|---|---|
| CaF$_2$ | 1.4 |

This was fired nested in a larger cylinder (see Example II) in the large production kiln and fired as taught in U.S. Pat. No. 3,639,101. Upon firing the crucible showed 30.1% gain in weight and a change in length of −5.3%. Overall density was 2.39 g/cc but unreacted zones were present in the structure. These zones were protected, however, by dense silicon oxynitride layers.

The crucible was filled with Hall bath (88% cryolite, 8% CaF$_2$, 4% Al$_2$O$_3$) and raised to 1000° C. in a tube furnace. It was held at this temperature for 236 hours. The crucible contained in molten bath with no apparent penetration of salt into the structure below the bath level. Previous experiments with a crucible of Si$_2$ON$_2$ of density 2.1 g/cc showed penetration and loss of bath after 100 hours.

EXAMPLE II

A cylinder, 5½" O.D.×⅜" wall×7-15/16" high, was isostatically pressed at 40,000 psi from the same raw batch as Example I. It was fired with the crucible of Example I. The silica fume in the raw batch had the following chemical analysis:

| | | | |
|---|---|---|---|
| SiO$_2$ | 96.1 | MgO | .23 |
| Fe$_2$O$_3$ | .34 | K$_2$O | .59 |
| MnO | .09 | Na$_2$O | .07 |
| Al$_2$O$_3$ | .21 | SO$_3$ | .35 |
| CaO | .35 | LoI | 1.68 |

Upon firing, the cylinder showed 31.9% weight gain and a change of length of −6.3%. Overall density was 2.51 g/cc. There was some evidence of unreacted zones in the structure. Test bars, 2×¼×⅛", were cut and surface ground from a portion that was fully reacted. Density of this portion was 2.60 g/cc or 92.8% of theoretical. Modulus of rupture was measured on 4 bars using 3 point loading with a 1" span and showed an average of 42,700 psi ranging from 41,700 to 44,000 psi with a standard deviation of 1409 psi. The breaks were clean and of a single fracture in contrast to multifracturing frequently found with reaction bonded silicon nitride.

Modulus of rupture at various temperatures of test bars, 1½×¼×⅛, machined from the cylinders of Example II were as follows:

| Temperature | Number of Breaks | Avg. MOR (psi) |
|---|---|---|
| 1000° C. | 4 | 27070 |
| 1150° C. | 2 | 11400 |
| 1300° C. | 2 | 9200 |
| 1450° C. | 2 | 6600 |

X-ray analysis showed the following approximate analysis as determined by peak ratios.

| | |
|---|---|
| Si$_2$ON$_2$ | 94% |
| α Si$_3$N$_4$ | 1 |
| β Si$_3$N$_4$ | 2 |
| Cristobalite | 0 |
| Silicon | 0 |
| Silicon Carbide | 3 |

Figure 2:
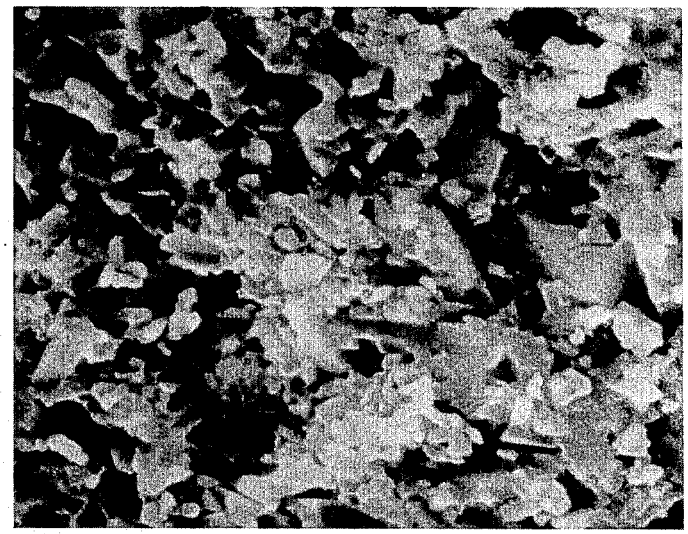
FIG. 2 is a photomicrograph (SEM) of the core of the cylinder of Example II magnified 5000 times.

Microstructure as shown in FIGS. 1 and 2 shows the area around a large rounded pore, the pore being approximately 60 microns in size. At 500× the structure of the fractured surface appears quite dense and shows evidence of some texture. At 5000×, the structure appears as clusters of orthorhombic crystals that have grown together. Pores do not appear to be continuous and range from about 0.2 to 1.0 microns in size and are irregular in shape.

EXAMPLE III

The following ingredients were mixed:

| | |
|---|---|
| 3μ silicon | 58.0% |
| Silica Fume | 31.0 |
| Cab-O-Sil | 10.3 |
| Powdered CaF$_2$ | 0.7 |

The batch was mixed as a slurry in methylene chloride with a Hobart mixer. The slurry was dried down to a powder which was well blended and free from aggregates. A tube with a closed end was made using a rubber molding technique with a rounded end arbor positioned about 1" from the closure of the rubber mold. The tube was pressed at 5000 psi and measured 1.68" O.D.×1" I.D.×38.62" long.

The tube was fired in a vertical position by hanging from a ¼" ceramic rod placed in holes drilled abut 1½" from the open end. The kiln was a production kiln with temperature rising to 1300° C. at 40°/hr. and holding at 1300° C. for about 50 hours then raising stepwise to 1420° C. all in a nitrogen atmosphere. Dimensions after firing were 1.51" O.D.×0.932" I.D.×35.00" long. Weight increased from 1191 g before firing to 1601 g after firing. Change in length was −9.4% change in weight was +34.4%. Density of a 24" length of the tube including the closed end was calculated to be 2.56 g/cc or 91.4% of theoretical at 2.8 g/cc.

The tube held water well indicating that porosity was fairly well closed off. The drop in water level in 5.17 hours was 0.38" which can be calculated to a permeability of 0.00056 cu.inches/square inch hour. This can be compared to a value of 0.0171 cu.in./sq.in.hr. for a similar tube with a density 71% of theoretical.

Thermal shock resistance of the tube was good, withstanding 11 cycles of plunging into a hot furnace at 1200° C. and cooling in air. Six of the cycles were force cooled with an air blast down the center of the tube.

Porosity of Si$_2$ON$_2$ items of various densities was measured by the ASTM boiling water technique with the following results:

| Density g/cc | % of Theoretical | % Total Porosity | % Open Porosity | % Closed Porosity |
|---|---|---|---|---|
| 2.087 | 74.54 | 25.46 | 22.40 | 3.06 |
| 2.542 | 90.79 | 9.21 | 4.61 | 4.60 |
| 2.63 | 93.93 | 6.07 | 2.60 | 3.47 |
| 2.644 | 94.45 | 5.55 | 1.07 | 4.48 |

Extrapolation of these data show that 95.7% of theoretical density all the pores would be closed and there would be 4.3% closed pores. These data follow a linear curve.

$$D_T = 95.68 - 0.94 (P_o)$$

where
$D_T$ = % of theoretical density
$P_o$ = % of open pores
index of determination = 0.997

The highest density achieved in this material so far is 94.4% of theoretical density which would have 1.3% open pores and 4.3% closed pores by the above equation.

Although scientific confirmation is yet to be made, it is hypothesized that this densified product is different in character and structure than other dense silicon oxynitride products. Hot pressed silicon oxynitride and sintered silicon oxynitride require additives such as MgO or aluminum to silicon oxynitride powder. In this case, the additive will concentrate at grain boundaries between the grains of $Si_2ON_2$. The properties of this type of body is dependent upon the character of the grain boundary. In dense silicon oxynitride as described in this patent, it is felt that grain boundaries are different in character. During the reaction to form $Si_2ON_2$, crystals of oxynitride grow out of nucleated clusters via the liquid phase until the clusters grow into one another and coalesce into larger clusters. Because of this "in situ" formation a network of oxynitride forms in which a minor glassy phase may occupy pores in the cluster and grain boundaries of glass are not present. Some confirmation of this is given by the observation that reasonably good strength exists at a temperature as high as 1450° C. Grain boundaries of glass containing calcium compounds and other impurities in the raw batch materials would very likely be soft and weak at 1450° C.

The appearance of fractured surface suggests that fracturing has occurred around clusters. The very high MOR values suggest that there were oxynitride bonds from cluster to cluster. This type of fracture shows that is microstructure is different from that found in hot pressed or sintered silicon oxynitride made from silicon oxynitride powder and also different from either hot pressed or reaction bonded silicon nitride. I would speculate that this type of strong cluster bonding would perform well under stress conditions such as impact of thermal shock because of the intricate and convoluted path that a line of fracture must take. Glass formation arising from fluxing additives enhance the properties by stuffing up the pores without disrupting the silicon oxynitride network resulting in a more impermeable body.

The foregoing detailed description of the invention is based on the best mode known to the inventor at the present time, and is not to be considered as limiting. The product of the invention can be made up of about 90 to about 98% by weight of silicon oxynitride and from about 2 to about 10% by weight of a glassy phase which in turn is composed essentially of silica and a reaction aid. The reaction aid or additive is preferably an oxide of calcium, strontium, barium, magnesium, cerium, yterrium or mixtures thereof, or compounds which decompose to these oxides.

What is claimed is:

1. A silicon oxynitride product consisting essentially of from 90 to 98% by weight of silicon oxynitride and 2 to 10% by weight of a minor glassy phase, said glassy phase being composed of silica and a minor quantity of a second metal oxide; said product being from about 85 to about 95% of theoretical density and having a microstructure which is a network of oxynitride crystal clusters with said minor glassy phase being located primarily in the interstices formed by the silicon oxynitride network.

2. The product of claim 1 wherein the density is 88 to 95% theoretical and said product has a modulus of rupture at 1450° C. of at least 5000 psi under three point loading using a one inch span.

3. The reaction bonded silicon oxynitride article of claim 1 wherein the density is 88 to 95% of theoretical and the glassy phase is about 5% by weight.

4. The reaction bonded silicon oxynitride of claim 1 wherein said reaction aid is a second metal oxide selected from the group consisting of calcium, strontium, barium, magnesium, cerium, yttrium, and mixtures thereof.

5. A method of forming reaction bonded silicon oxynitride articles comprising the steps of:
(a) mixing together 45 to 65% by weight of silicon having a particle size of 3 microns and finer, and 0.5 to 6% by weight of a powdered reaction aid;
(b) cold forming the mixture into the desired shape;
(c) firing said shape in an atmosphere of nitrogen which is reasonable free of oxygen, at a temperature of from 1280° to 1400° C. for at least one hour.

6. The method of claim 5 wherein said reaction aid is a second oxide or source thereof having a cation selected from the group consisting of calcium, strontium, barium, magnesium, cerium, yttrium, and mixtures thereof and wherein said firing is carried out in nitrogen atmosphere containing no oxygen for a period of at least 10 hours.

7. A silicon oxynitride product made according to the process of claim 5.

8. A silicon oxynitride product made according to claim 6.

* * * * *